United States Patent
McAnulty

(10) Patent No.: US 7,976,355 B2
(45) Date of Patent: Jul. 12, 2011

(54) FLEXIBLE TOSS TOY

(76) Inventor: Roy E. McAnulty, Englewood, CO (US)

( * ) Notice: Subject to any disclaimer, the term of this patent is extended or adjusted under 35 U.S.C. 154(b) by 263 days.

(21) Appl. No.: 11/517,989

(22) Filed: Sep. 9, 2006

(65) Prior Publication Data

US 2008/0064289 A1    Mar. 13, 2008

Related U.S. Application Data

(60) Provisional application No. 60/596,226, filed on Sep. 9, 2005.

(51) Int. Cl.
*A63H 27/00* (2006.01)

(52) U.S. Cl. ........... 446/46; 446/48; 119/707; D30/160; D21/443

(58) Field of Classification Search ............... 446/46, 446/48; D30/160; 119/702, 707, 709, 710, 119/711; D21/443; 473/588, 589
See application file for complete search history.

(56) References Cited

U.S. PATENT DOCUMENTS

| | | | | | |
|---|---|---|---|---|---|
| 4,023,805 | A | * | 5/1977 | Sherrill | 473/588 |
| 4,104,822 | A | * | 8/1978 | Rodgers | 446/48 |
| 4,246,720 | A | * | 1/1981 | Stone | 446/47 |
| 4,290,226 | A | | 9/1981 | Stauffer | |
| 4,302,901 | A | * | 12/1981 | Psyras | 446/46 |
| 4,395,046 | A | * | 7/1983 | Cosmopulos | 473/588 |
| 4,425,734 | A | * | 1/1984 | Bauer | 446/48 |
| 4,515,570 | A | * | 5/1985 | Beltran | 446/47 |
| 4,919,083 | A | * | 4/1990 | Axelrod | 446/46 |
| 5,078,637 | A | | 1/1992 | McFarland | |
| 5,195,916 | A | * | 3/1993 | Her | 446/46 |
| 5,269,716 | A | * | 12/1993 | Viola | 446/48 |
| D345,586 | S | | 3/1994 | Hanna | |
| 5,319,531 | A | * | 6/1994 | Kutnyak | 446/47 |
| 5,326,110 | A | | 7/1994 | Gould | |
| 5,476,405 | A | * | 12/1995 | Clayborne | 446/46 |
| 5,553,570 | A | * | 9/1996 | VanNatter et al. | 446/46 |
| 5,676,581 | A | * | 10/1997 | Ziegler | 446/46 |
| 5,799,616 | A | * | 9/1998 | McClung, III | 446/46 |
| 6,073,588 | A | * | 6/2000 | McClung et al. | 119/709 |
| 6,200,185 | B1 | * | 3/2001 | Kuster, Jr. | 446/46 |
| 6,247,989 | B1 | * | 6/2001 | Neff | 446/46 |
| D466,561 | S | * | 12/2002 | Vodhanel, Jr. | D21/443 |
| 6,599,163 | B1 | * | 7/2003 | Kotsonis et al. | 446/46 |

(Continued)

FOREIGN PATENT DOCUMENTS

WO          9803239          1/1998

*Primary Examiner* — Gene Kim
*Assistant Examiner* — Urszula M Cegielnik
(74) *Attorney, Agent, or Firm* — Russ Weinzimmer; Russ Weinzimmer & Associates PC

(57) ABSTRACT

A flexible toss toy is disclosed which includes a feature that makes it easier for a dog to pick up and retrieve the disc after being thrown. The disc is saucer-shaped and is made of a soft elastomeric material. The disc has an outer-diameter leading edge, an intermediate top deck surface, and a central portion. The intermediate top deck surface has a circumferential gripping projection. The circumferential gripping projection extends upward with respect to the intermediate top deck surface, and radially inward. The central portion has an elevated portion in a plane above the intermediate top deck surface. The circumferential gripping projection extends upwardly and radially inward to an extent that facilitates gripping by the teeth of a dog. Also, the circumferential gripping projection extends upwardly to an extent that is higher above the intermediate top deck surface than the elevated portion of the central portion.

19 Claims, 3 Drawing Sheets

U.S. PATENT DOCUMENTS

| | | | |
|---|---|---|---|
| 6,672,253 B1 * | 1/2004 | Viola | 446/46 |
| 6,918,809 B2 * | 7/2005 | Persall | 446/46 |
| D509,259 S * | 9/2005 | Dennis | D21/444 |
| 7,096,826 B2 * | 8/2006 | Markham | 446/46 |
| 7,270,588 B2 * | 9/2007 | Frazier et al. | 446/46 |
| 2002/0017759 A1 * | 2/2002 | McClung et al. | 446/46 |
| 2002/0111105 A1 * | 8/2002 | Silverglate | 446/46 |
| 2003/0013373 A1 * | 1/2003 | Bloeme et al. | 446/46 |
| 2003/0027480 A1 | 2/2003 | Huset | |
| 2004/0166764 A1 | 8/2004 | Stark | |
| 2005/0059315 A1 | 3/2005 | Schouten | |
| 2005/0092258 A1 * | 5/2005 | Markham | 119/707 |
| 2005/0136789 A1 | 6/2005 | Liu | |
| 2005/0239366 A1 | 10/2005 | Nuccio et al. | |
| 2005/0287902 A1 | 12/2005 | Forti et al. | |

* cited by examiner

FLEXIBLE TOSS TOY

CROSS-REFERENCES TO RELATED APPLICATIONS

This application is entitled to the benefit of Provisional Patent Application No. 60/596,226, entitled "Flexible Toss Toy", filed Sep. 9, 2005, herein incorporated by reference.

FIELD OF THE INVENTION

This invention relates to dog toys, and particularly relates to flying discs especially suited for play with dogs.

BACKGROUND OF THE INVENTION

Flying discs are well-known as toss toys. When properly thrown, they fly a distance, and then land like an inverted saucer. A normally oriented (upright) saucer can easily be picked up by its outer edge which extends upwards at some angle. However, when a saucer is inverted, the outer edge extends downward, and consequently does not present an edge that is easy to grasp.

A Frisbee® (Registered Trademark of Wham-o, Inc) is a flying disc that can be used as a toss toy. Dogs enjoy chasing, catching, and retrieving such flying discs. However, the standard Frisbee is too hard for use as a toss toy for dogs. Consequently, soft rubbery versions of the Frisbee are sold that are made from a more pliable material that better resists a dog's bite, and prevents possible injury to the dog that may occur with more rigid materials.

Such softer more pliable versions of the Frisbee, and the like, nevertheless retain the same problem of an inverted saucer, i.e., it is hard to pick up by its edge because the outer edge extends downward and contacts the ground. Consequently, when a Frisbee lands properly, it does not present an edge that is easy to grasp by a person's hand.

Further, when retrieving a Frisbee (or the like), dogs have a particularly difficult time picking up the Frisbee when it lands properly, i.e., like an inverted saucer with its outer edge extending downward and contacting the ground all about its circumference. This is because dogs use their mouth to pick up the disc, and a dog's mouth has substantially less dexterity than a person's hand. Thus, the outer edge presents a substantial problem for a dog, making even a soft flexible Frisbee very difficult for a dog to pick up and retrieve.

SUMMARY OF THE INVENTION

In a general aspect, the invention is a flexible toss toy including a saucer-shaped disc having an outer-diameter leading edge, an intermediate top deck surface, and a central portion, the intermediate top deck surface including a circumferential gripping projection.

In a preferred embodiment, the circumferential gripping projection extends upward with respect to the intermediate top deck surface, and radially inward.

In another preferred embodiment, the circumferential gripping projection extends upward and perpendicularly with respect to the intermediate top deck surface.

In yet another preferred embodiment, the circumferential gripping projection extends upward with respect to the intermediate top deck surface, and radially outwardly.

In a still further preferred embodiment, the circumferential gripping projection has a cross-section that is widest where it meets the intermediate top deck surface.

In another preferred embodiment, the circumferential gripping projection has a cross-section that is narrowest at a point farthest from the intermediate top deck surface.

In a further preferred embodiment, the circumferential gripping projection inclines radially at an angle between 35 and 50 degrees with respect to the intermediate top deck surface.

In preferred embodiments, the circumferential gripping projection extends upwardly and radially inward to an extent that facilitates gripping by the teeth of a dog.

In some preferred embodiments, the circumferential gripping projection extends upwardly to an extent that is higher than an elevated portion of the central portion.

In other preferred embodiments, the circumferential gripping projection has a base that transitions into the intermediate top deck surface using a rounded transition.

In preferred embodiments, the saucer-shaped disc is made of an elastomeric material. In further preferred embodiments, the saucer-shaped disc is made of a soft elastomeric material.

In some preferred embodiments, the central portion includes an elevated portion in a plane above the intermediate top deck surface. In other preferred embodiments, the elevated portion includes a depressed portion.

In further preferred embodiments, wherein the central portion includes a depressed portion in a place below the intermediate top deck surface. In still further preferred embodiments, the depressed portion includes an elevated portion.

In other preferred embodiments, the central portion includes an open cavity.

The circumferential gripping projection can be used by a dog to more easily grab the toy with its mouth.

An elevated or depressed central portion adds support and strength to the saucer-shaped disc of the invention.

The soft elastomer used to manufacture the disc of the invention will not cut the mouth of a dog when catching the disc in its mouth, and will not cause serious damage to property when struck by the disc. Further, the soft elastomer of the disc is easy on human hands when catching the disc.

BRIEF DESCRIPTION OF THE DRAWING

The invention will be more fully understood by reference to the detailed description, in conjunction with the following figures, wherein.

DETAILED DESCRIPTION

Figure 1:
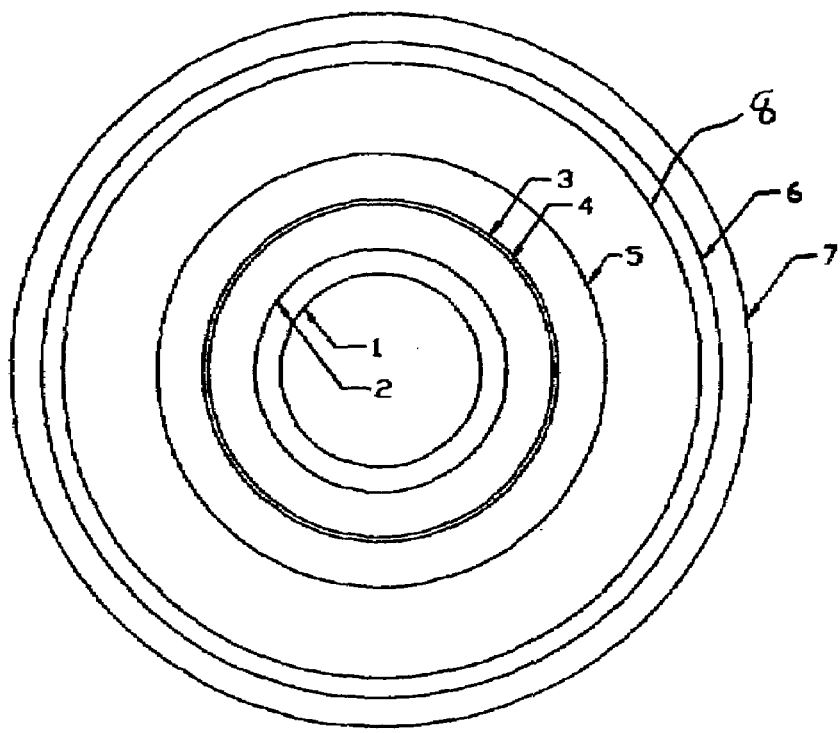
FIG. 1 is a top view of an embodiment of the disc of the invention.

With reference to FIG. 1, a preferred embodiment of the flexible toss toy disc of the invention includes a variety of features which will be described in detail using concentric circles which shall be referred to herein as "rings".

In the preferred embodiment shown in FIG. 1, the disc of the invention has a top deck surface that is partitioned by the rings. For example, the area of the top deck surface within ring 1 is substantially flat.

The area between rings 1 and 2 is sloped downward at an angle of 45 degrees, for example. The slope can be any slope that provides desirable aerodynamic and/or aesthetic properties. The area within ring 2 is an example of a "central portion" of the disc.

The area between rings 2 and 5 is also substantially flat, but at a lower level than the area within ring 1 due to the downward slope between rings 1 and 2.

The area between rings 3 and 5 slopes upward and back, over a portion of the area between rings 2 and 5. The area between rings 3 and 5 is a top view of what is a top view of a portion of what is referred to herein as "a circumferential gripping projection".

The rest of the top view of the circumferential gripping projection is found between rings 3 and 4. The area between rings 3 and 4 is relatively thin, and in this preferred embodiment is substantially flat. Because the area between rings 3 and 5 slopes upward, the area between rings 3 and 4 is elevated with respect to the area between rings 2 and 5. In some embodiments, the area between rings 3 and 4 is also elevated with respect to the area within ring 1, as shown in FIG. 4A, for example.

The area between rings 6 and 7 forms a sloping surface that starts flat and curves downward until the sloping surface is substantially vertical, thereby forming the rim of the disc.

Figure 3A:
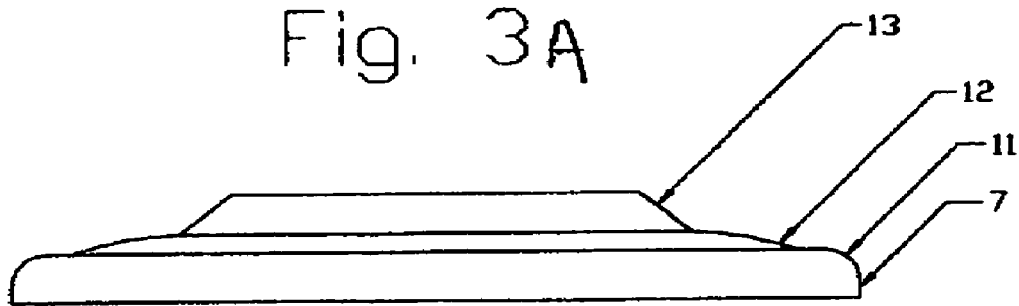
FIG. 3A is a side view of the disc of FIG. 1.
Figure 4A:
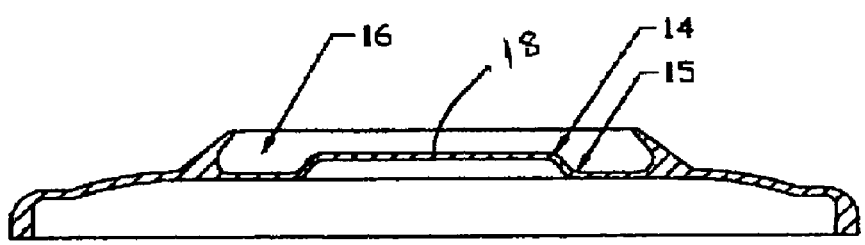
FIG. 4A is a cross-sectional side view of the disc of FIG. 1.

As shown in the embodiments of FIGS. 3A and 4A, the area between rings 6 and 8 slopes upward. The area between rings 8 and 5 slopes more gently than the area between rings 6 and 8.

The area between rings 2 and 6 is an embodiment of what is herein referred to as the "intermediate top deck surface". Note that the circumferential gripping projection seen as the area between rings 3 and 5 is located on the intermediate top deck surface within rings 2 and 6.

Figure 2:
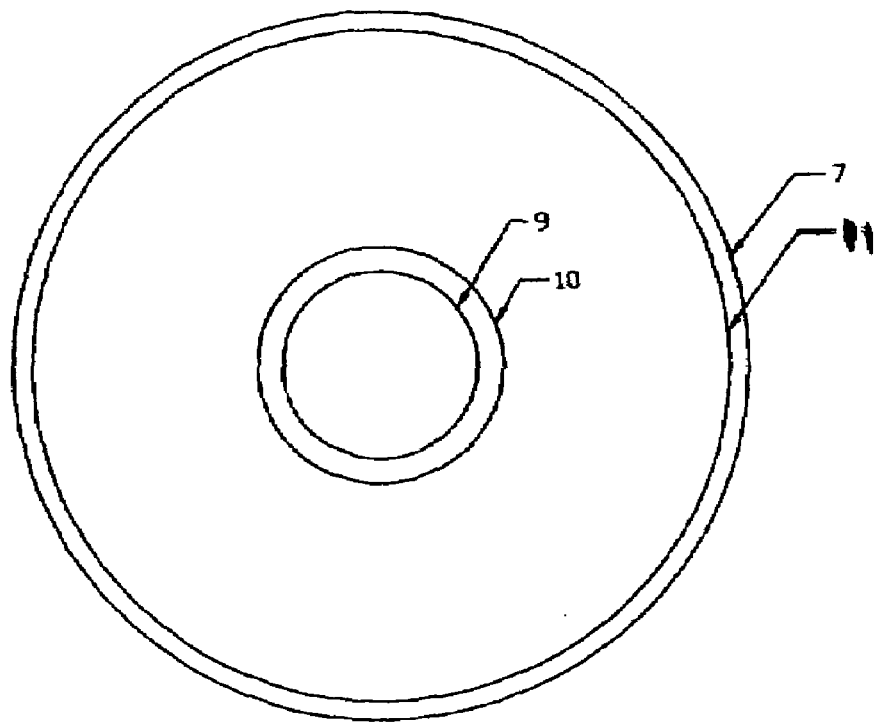
FIG. 2 is a bottom view of the disc FIG. 1.

With reference to FIG. 2, a bottom view of the disc of FIG. 1 is provided showing a flat surface within ring 9 that is depressed with respect to the flat surface between rings 10 and 11. Thus, the area between rings 9 and 10 slopes upward from the area within ring 9 to the area within rings 10 and 11.

The area between rings 7 and 11 is flat and in a plane that is higher with respect to both the area between rings 10 and 11 and the area within ring 9. The area between rings 7 and 11 is the bottom surface of the rim of the disc.

Referring to FIG. 3A, a side view of the embodiment of FIG. 1 is shown. The edge (ring 7) of the disc is shown which forms the outer boundary of the rim (ring 11) of the disc. A portion 12 of the intermediate top deck surface slopes upward and surrounds the circumferential gripping projection 13.

Figure 3B:
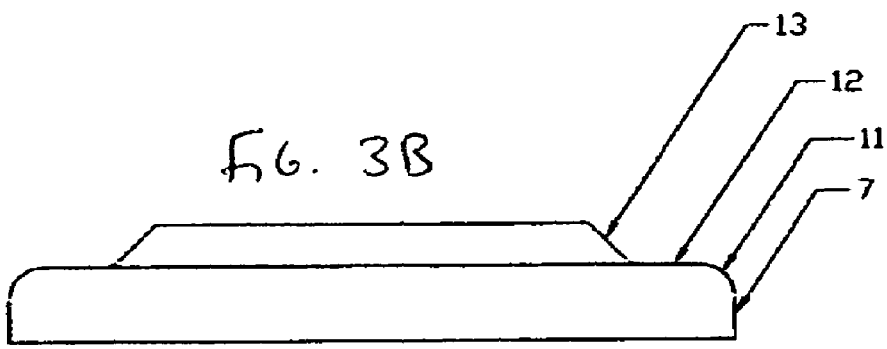
FIG. 3B is a side view of an alternate embodiment of the disc of the invention.

Referring to FIG. 3B, an alternate embodiment is shown where the portion 12 surrounds the circumferential gripping projection 13, but does not slope.

FIG. 4A shows a cut-away side view of the embodiment of FIGS. 1 and 3A. The region between points 14 and 15 slopes upward from the intermediate top deck surface to form the elevated central portion 18 of the disc. The inner surface of the circumferential gripping projection 13 surrounds the elevated central portion 18 of the disc.

Figure 4B:
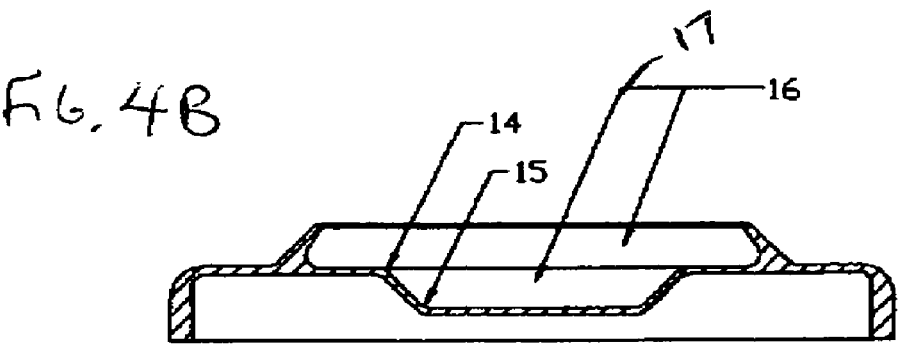
FIG. 4B is a cross-sectional side view of the alternate embodiment of FIG. 3B.

FIG. 4B shows a cut-away side view of the embodiment of FIG. 3B. The region between points 14 and 15 slopes downward from the intermediate top deck surface to form the depressed central portion 17 of the disc. The inner surface of the circumferential gripping projection 13 surrounds the depressed central portion 17 of the disc.

Figure 5:
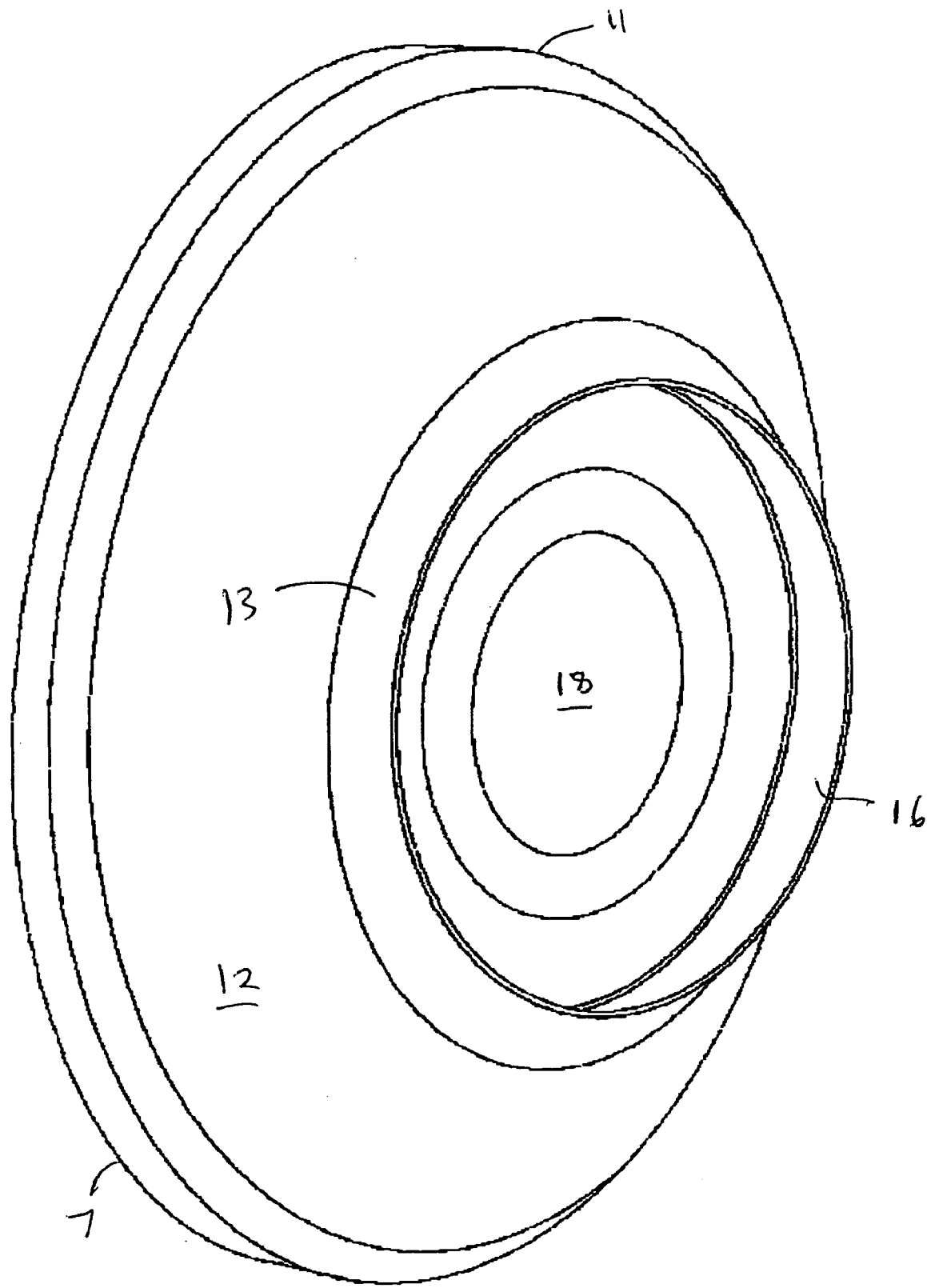
FIG. 5 is an isometric view of the disc of FIG. 1.

With reference to FIG. 5, an isometric view of the embodiment of FIGS. 1 and 3A is shown, illustrating various features of the disc. In this view it can be seen that the elevated central portion 18 of the disc is surrounded by the circumferential gripping portion 13 having an inner surface 16. The portion 12 is shown which is a portion of the intermediate top deck surface. More of the intermediate top deck surface is visible between the inner surface 16 of the circumferential gripping portion, and the elevated central portion 18.

The circumferential gripping portion 13 is of a height above the intermediate top deck surface of the disc such that it can be gripped by the teeth of a dog when the disc lands top side up. The disc is made of a rubbery or elastomeric material that is flexible and soft so as not to harm the dogs teeth, or be harmed by the dogs teeth.

The inclusion of the elevated central portion 18 (or the depressed portion 17) serves to add strength to the deck of the disc.

Other modifications and implementations will occur to those skilled in the art without departing from the spirit and the scope of the invention as claimed. Accordingly, the above description is not intended to limit the invention except as indicated in the following claims.

What is claimed is:

1. A flexible toss toy comprising:
    a saucer-shaped disc made of a soft elastomeric material,
    the disc having an outer-diameter leading edge, a central portion, and an intermediate top deck surface extending between the leading edge and the central portion,
    the intermediate top deck surface including a circumferential gripping projection, the circumferential gripping projection emanating from and extending upward with respect to the intermediate top deck surface to an edge portion, and further extending radially inward toward the central portion, the edge portion being the farthest portion from the intermediate top deck surface, the gripping projection being thin and extending upwardly and radially inward to an extent that it is readily grippable by the teeth of a dog, and
    the central portion including an elevated portion in a plane above the intermediate top deck surface.

2. The flexible toss toy of claim 1, wherein the circumferential gripping projection extends upward with respect to the intermediate top deck surface, and radially inward.

3. The flexible toss toy of claim 1, wherein the circumferential gripping projection extends upward and perpendicularly with respect to the intermediate top deck surface.

4. The flexible toss toy of claim 1, wherein the circumferential gripping projection extends upward with respect to the intermediate top deck surface, and radially outwardly.

5. The flexible toss toy of claim 1, wherein the circumferential gripping projection has a cross-section that is widest where it meets the intermediate top deck surface.

6. The flexible toss toy of claim 1, wherein the circumferential gripping projection has a cross-section that is narrowest at a point farthest from the intermediate top deck surface.

7. The flexible toss toy of claim 1, wherein the circumferential gripping projection inclines radially at an angle between 35 and 50 degrees with respect to the intermediate top deck surface.

8. The flexible toss toy of claim 1, wherein the intermediate top deck surface slopes downwardly between the circumferential gripping projection and the leading edge.

9. The flexible toss toy of claim 1, wherein the circumferential gripping projection extends upwardly to an extent that is higher than an elevated portion of the central portion.

10. The flexible toss toy of claim 1, wherein the circumferential gripping projection has a base that transitions into the intermediate top deck surface using a rounded transition.

11. The flexible toss toy of claim 1, wherein the saucer-shaped disc is made of an elastomeric material.

12. The flexible toss toy of claim 1, wherein the saucer-shaped disc is made of a soft elastomeric material.

13. The flexible toss toy of claim 1, wherein the central portion includes an elevated portion in a plane above the intermediate top deck surface.

14. The flexible toss toy of claim 13, wherein the elevated portion includes a depressed portion.

15. The flexible toss toy of claim 1, wherein the central portion includes a depressed portion in a plane below the intermediate top deck surface.

16. The flexible toss toy of claim 15, wherein the depressed portion includes an elevated portion.

17. The flexible toss toy of claim 1, wherein the central portion includes an open cavity.

18. The flexible toss toy of claim 1, wherein the intermediate top deck surface slopes downwardly between the circumferential gripping projection and the leading edge.

19. The flexible toss toy of claim 1, wherein the circumferential gripping projection extends upwardly to an extent that its edge portion is higher above the intermediate top deck surface than any part of the central portion.

* * * * *